June 1, 1926.
J. E. GROSJEAN
SOLE FOR BOOTS AND SHOES
Filed August 15, 1925
1,587,377
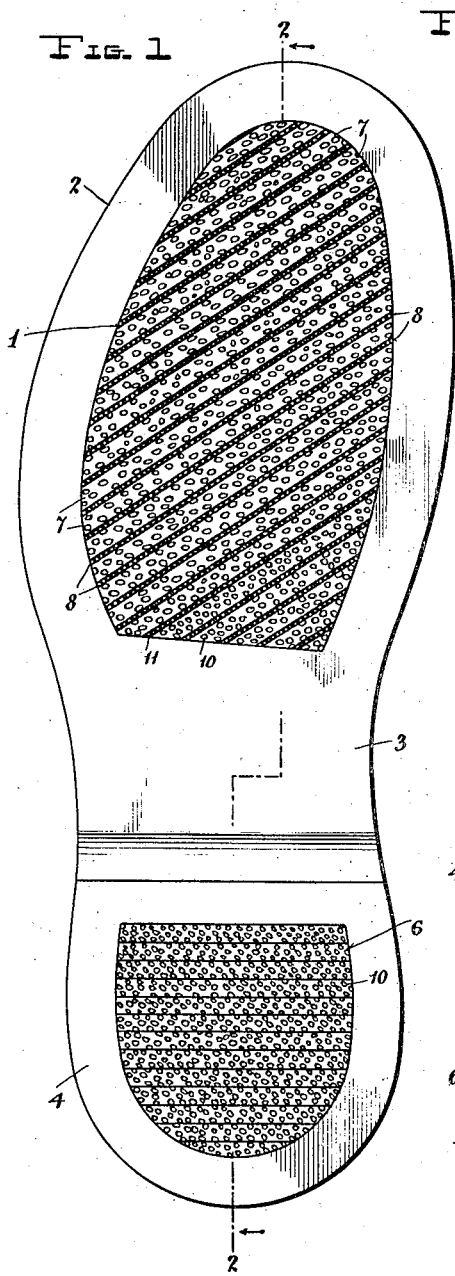
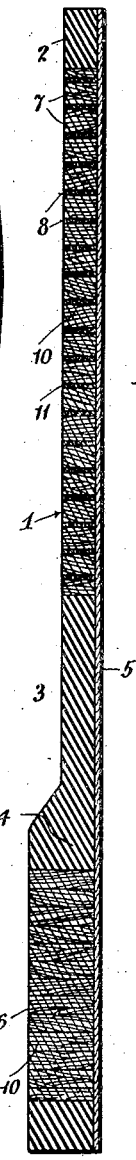
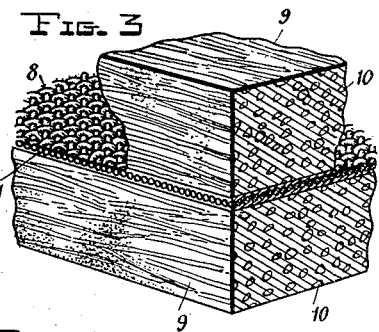
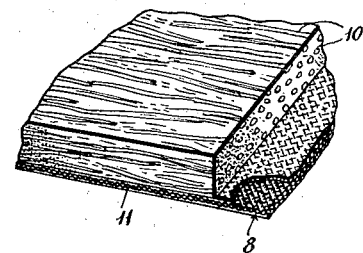
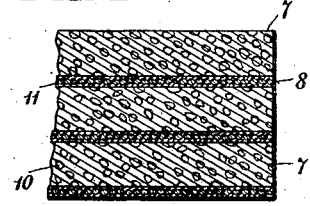
Inventor
James E. Grosjean,
By
Attorney Patented June 1, 1926.

1,587,377

UNITED STATES PATENT OFFICE.

JAMES E. GROSJEAN, OF LIMA, OHIO.

SOLE FOR BOOTS AND SHOES.

Application filed August 15, 1925. Serial No. 50,443.

The present invention relates to improvements in soles for boots and shoes, and more particularly, to those of the class composed of rubber and textile fibers. The invention is more especially an improvement upon the sole described and illustrated in my co-pending application, Serial No. 722,552, filed June 26, 1924, of which the present application is a continuation in part, wherein the sole comprises a series of strips, each composed of so-called "friction" or high-grade rubber having unwoven textile threads or cords loosely distributed therein, so that most of the threads or cords are presented endwise to the treads or wear surface, the whole being re-claimed from the uncured or unvulcanized waste trimmings or scraps resulting from the manufacture of automobile tires, and especially cord tires.

The primary object of the present invention is to provide an improved sole composed of alternate strips of the re-claimed tire material comprising friction and unwoven threads or cords distributed therein and intervening single plies of woven fabric between said strips of reclaimed tire material to reinforce, bind and hold the plies of unwoven cords and friction material which surrounds the loose unwoven cords before and after vulcanization. Soles constructed in this manner will not only be lighter in weight and less expensive to manufacture and will possess greater non-skid and wear-resistive properties because each loose cord is surrounded by pure friction rubber which affords a considerable amount of yield around each cord, as compared with soles as heretofore made of rubber without unwoven threads or cords distributed therein, but the intervening plies of woven fabric securely bind together the strips of rubber and distributed cords, and they reinforce these strips in a manner which prevents stretching thereof, notwithstanding their high degree of resilience, thereby avoiding bulging of the sole, as the fabric plies resist stretching of the strips and act to retain the sole in proper shape.

In the accompanying drawing:—

Figure 1 is a view of the tread or wear surface of a sole embodying the present invention;

Figure 2 represents a section taken longitudinally through the sole on the line 2—2 of Figure 1;

Figure 3 is a fragmentary sectional view of the sole structure on an enlarged scale illustrating one of the single plies of fabric and its relationship with the strips of friction and cords between which it is interposed;

Figure 4 is a perspective view of a portion of the re-claimed friction and cord material and one of the plies of fabric showing the manner in which the fabric ply is applied to the re-claimed friction and cord material during the course of manufacture of the sole; and Figure 5 is a detail sectional view of a number of the strips of re-claimed friction and cord material assembled with the intervening single plies of fabric to form the sole structure.

Similar parts are designated by the same reference characters in the several views.

The sole preferably, and as shown in the present instance, comprises a body portion 1 which is surrounded by a marginal portion 2, which latter may be composed of a suitable rubber compound, such, for example, as that commonly used in the making of ordinary rubber soles and heels, this marginal portion being extended, in the present instance, to form the shank 3, and also the marginal portion 4 of the heel. The upper side of the sole preferably has a strip of woven fabric 5 applied thereto to form a base or backing, the body portion 1 of the sole and the body portion 6 of the heel preferably extending throughout the thickness of the sole and heel, respectively, as will be clear from Figure 2, and when the sole is completed, it is cured or vulcanized to securely unite or bind together its constituents.

The body portion 1 of the sole, according to the present invention, is composed of a series of substantially parallel strips 7 which extend diagonally or otherwise across the sole, and intervening single plies 8 of woven textile fabric. The strips 7, according to the present invention, are made from re-claimed uncured waste tire material consisting of the trimmings or remnants of the tire material produced during the manufacture of automobile tires, such material being generally discarded by tire manufacturers as waste. The material of which the strips 7 are composed may be prepared from the waste trimmings or remnants of tire material, especially the trimmings or remnants resulting during the manufacture of cord pneumatic tires, by the method or procedure set forth fully in my co-pending application hereinbefore referred to. For present purposes, it may be explained that the waste trimmings, scraps or remnants produced during the manufacture of pneumatic tires and which are composed of so-called "friction," which is a very high-grade of rubber, and textile fibers in the form of woven fabric or cords which are gum-dipped or impregnated with the friction, and also coated on opposite sides with friction, while in uncured or unvulcanized state, are passed through a cracker embodying opposed corrugated rolls one of which rotates at a greater peripheral speed than the other, the action of which is to destroy any woven form the cords or threads may have and to re-arrange the cords, threads or fibers in this unvulcanized and, hence, plastic mass, so that most of the cords, threads or fibers extend in the same direction in the sheet of material delivered from the cracker; and after the material has been treated by the cracker sufficiently to bring the cords, threads or fibers into substantial parallelism, the sheet or strip of the material may be passed between smooth-faced rolls which serve to roll the material into a sheet or strip which is smooth on both sides and is of uniform thickness and which also continue to straighten out the cords, owing to the fact that one of these rolls rotates at a greater peripheral speed than the other. A portion of such a sheet is represented in Figure 4 and is designated 9, this strip being composed of a body of the uncured or unvulcanized, and hence, plastic friction or high-grade rubber having numerous cords, threads or fibers designated 10 which are in unwoven relation and are distributed in the friction or rubber loosely or in unconnected relationship with respect to one another, so that most of these cords, threads or fibers extend in the same direction. The friction and cords, threads or fibers, as found in re-claimed uncured cord tire material are usually in the proportion of one part cords, threads or fibers to two parts of friction or high-grade rubber. Such a proportion is well suited to the purposes of the present invention as the cords, threads or fibers will be completely surrounded by the friction or rubber and when vulcanized, the resulting material will possess a high degree of resilience and wear-resisting properties. It is preferable to prepare this material from the waste trimmings, scraps or remnants resulting from the manufacture of cord tires, and furthermore, it is preferable to prepare this material from waste tire material wherein the cords or threads are of a high grade and which have been subjected to a gum-dipping treatment whereby they are impregnated or saturated with a high-grade friction or rubber solution which renders them highly resilient or flexible and waterproof and greatly increases their wear-resisting properties.

The body portion 6 of the heel may be composed of a series of strips cut transversely or crosswise from the strip 9, the cords or threads in such strips being presented endwise to the tread surface of the heel. The high degree of resilience or elasticity of the strips made from the sheet 9 will afford the desired degree of cushioning action in the heel. However, such cushioning action is not necessary or desirable in the sole and, furthermore, the high degree of resilience or elasticity of the strips, if unrestrained in the sole, would permit the sole to bulge or otherwise lose its flat form, and, moreover, the sole would be subject to spreading, due to the stretching of the material, and if such occurred, the sole would lose its form or outline. Accordingly, the body portion 1 of the sole is made up of a series of strips designated 7 which are obtained by cutting sections of appropriate length crosswise or transversely from the sheet 9 so that the ends of the cords or threads will be presented to the tread or wear surface when these strips are assembled side by side, and a single ply of woven fabric designated 8 is interposed between and united by vulcanization to the strips, detail sectional views of this composite sole structure being shown in Figs. 3 and 5. In the manufacture of the sole, a sheet 9 prepared from the waste tire material and composed of the friction and the unwoven or loosely distributed cords or threads therein has a single ply of fabric designated 11 in Figure 4 applied to a side thereof, the fabric ply being impregnated with and also coated on both faces thereof with friction or high-grade rubber. Strips 9 and 11 which, at this time, are in an uncured or unvulcanized condition, may be passed between smooth-faced rolls so that the composite strips will be made smooth on both sides and of uniform thickness, and in making up the body portion 1 of the sole strips may be cut transversely or crosswise from the composite sheet 9 and 11 so that each strip will comprise a strip 7 obtained from the waste tire material and a single ply of fabric 8. These composite strips are assembled side by side, as is indicated in Figure 5, so that a single fabric ply 8 lies between each adjacent pair of strips 7 made from the waste tire material, and the ends of the cords or threads in the strips 7 will be presented to the side of the sheet thus made up which is to form the fabric tread surface of the sole, and the fabric plies 8 will be presented edgewise to such tread surface. The fabric plies 8 are preferably so arranged that their threads extend at about 45° to the tread surface. The sheet made up by assembling the strips 7 and alternating fabric plies 8 while these elements are in uncured or unvulcanized condition, may be cut to the proper sizes and shapes to form the body portions of the soles, and as each sole is completed by providing it with the rubber compound to form the marginal portion 2, the shank 3 and the heel, and the backing 5 of woven fabric has been applied, the whole is placed in a mold and cured in the manner usual in the manufacture of rubber soles and heels. The curing of the sole vulcanizes the friction or rubber constituents thereof, the strips 7 and the intervening single plies of friction coated and impregnated fabric being securely united or bonded together by vulcanization, and the marginal portion 2 of the sole being vulcanized to and thus united with the body portion 1, the sole portions 1 and 2 being vulcanized to and thus united with the backing or base 5. Where the heel comprises a body 6 composed of strips prepared from a sheet of the waste tire material without intervening plies of fabric, the strips in the heel, when vulcanized by curing, will be securely bonded together and united with the marginal portion of the heel and the backing or base 5.

By constructing the sole or the body portion thereof from strips obtained from reclaimed waste tire material consisting of friction or high-grade rubber and cords or threads which are unwoven and distributed therein loosely and so that they extend mostly in the same direction, with intervening or interposed single plies of woven fabric which are vulcanized and thus securely bonded to the strips 7, stretching of the strips 7 due to the highly elastic properties thereof, and which, if permitted to occur, would cause bulging or spreading, or distortion of the sole, is resisted by the substantially non-stretchable property of the interposed fabric plies 8 which are vulcanized and, hence, securely united to the strips 7 and to the base fabric. However, the highly resilient or elastic properties of the strips 7 insure maximum wear-resistive properties for the tread surface of the sole and will outwear a more rigid or less elastic material. The wear-resistive properties of the sole furthermore are increased by the presentation of the ends of the cords or threads in the strips 7 to the wear surface and the presentation of the fabric plies 8 edgewise to the wear surface. The interposed fabric plies 8 serve, in effect, as substantially unstretchable ties which extend across the sole in parallelism with the highly elastic strips 7 and they thereby prevent bulging or spreading of the sole as might otherwise occur due to the highly elastic properties of the strips 7. The edges of the relatively rigid or incompressible fabric plies provide, under the weight of the wearer, ribs which increase efficient non-skid properties for the sole, and the exposure of the edges of these fabric plies and the ends of the cords or threads in the strips 7, at the tread surface, increases the wear-resisting properties of the sole. Furthermore, the use of the textile cords or threads in the strips 7, as well as the textile material in the fabric plies materially reduces the weight of the sole, as distinguished from those composed mainly of rubber compounds as heretofore. The utilization of waste tire material for the manufacture of the soles enables the soles to be made of the highest grade materials at a reasonable cost.

The preferred embodiment of the invention is shown and described above but it will be understood that equivalent constructions are contemplated and that such will be included within the scope of the claims.

I claim as my invention:—

1. A sole for boots and shoes comprising strips composed of high-grade friction having unwoven threads or cords distributed therein, and intervening plies of woven fabric between said strips and acting to prevent stretching or bulging thereof.

2. A sole for boots and shoes comprising strips composed of high-grade friction having unwoven threads or cords distributed loosely therein, most of said threads or cords being arranged perpendicularly to the tread surface, and intervening single plies of woven fabric between said strips and arranged edgewise to the tread surface.

3. A sole for boots and shoes comprising a series of substantially parallel strips composed of high-grade friction having unwoven threads or cords distributed loosely therein, and intervening single plies of woven fabric interposed between said strips and arranged edgewise to the tread surface, each ply of fabric being friction coated on opposite sides and said strips and interposed fabric plies being united by vulcanization.

4. A sole for boots and shoes comprising a series of strips made from reclaimed uncured waste tire material and composed of high-grade friction having unwoven textile cords or threads distributed loosely therein, most of said cords or threads being presented endwise to the tread surface, and intervening single plies of woven fabric interposed between said strips and presented edgewise to the tread surface, 5. A sole for boots and shoes comprising a series of strips made from reclaimed uncured waste cord tire material and composed of high-grade friction having unwoven textile cords distributed loosely therein, most of said cords being presented endwise to the tread surface, said strips themselves being highly elastic, and single plies of woven fabric interposed between said strips and presented edgewise to the tread surface, said fabric plies uniting said strips and affording them sufficient rigidity to prevent stretching or bulging of the sole.

In testimony whereof I have hereunto set my hand.

JAMES E. GROSJEAN.